United States Patent [19]

Morimoto

[11] Patent Number: 4,658,531

[45] Date of Patent: Apr. 21, 1987

[54] DETECTOR FOR DETECTING A BIT OF A FISH

[75] Inventor: Shinichi Morimoto, Nishinomiya, Japan

[73] Assignee: Shimano Industrial Company Limited, Osaka, Japan

[21] Appl. No.: 830,123

[22] Filed: Feb. 18, 1986

[30] Foreign Application Priority Data

Mar. 4, 1985 [JP] Japan .............................. 60-30436[U]

[51] Int. Cl.⁴ .............................................. A01K 97/12
[52] U.S. Cl. ...................................................... 43/1.7
[58] Field of Search .............................. 43/16, 17, 17.1

[56] References Cited

U.S. PATENT DOCUMENTS

| | | | |
|---|---|---|---|
| 3,382,598 | 5/1968 | Wilson | 43/17 |
| 3,461,592 | 8/1969 | Makino | 43/17.1 |
| 4,021,957 | 5/1977 | Gleason | 43/16 |
| 4,437,255 | 3/1984 | Reed | 43/17 |
| 4,516,348 | 5/1985 | Hirose et al. | 43/17 |

Primary Examiner—M. Jordan
Attorney, Agent, or Firm—Stevens, Davis, Miller & Mosher

[57] ABSTRACT

The detector is mounted on a fishing line carrying a fish-hook. A stopper is fixed to the fishing line and is moved together with the line when pulled. A sensor is actuated by movement of the stopper, and an oscillator emits an output signal through operation of the sensor. The output signal is received by a receiver, thereby enabling detection of a bite of a fish.

5 Claims, 8 Drawing Figures

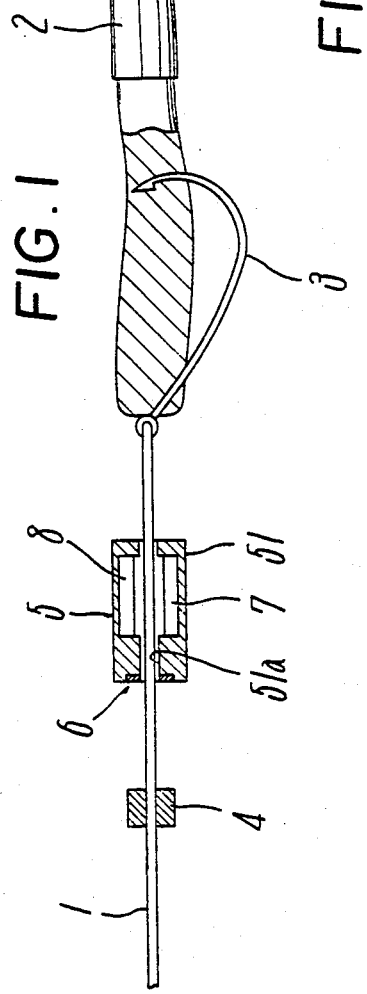
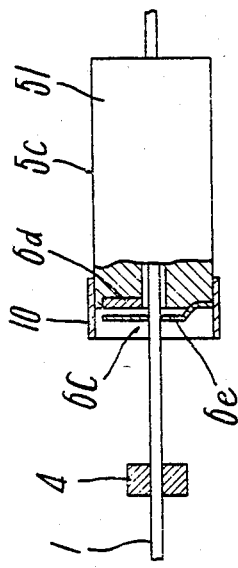
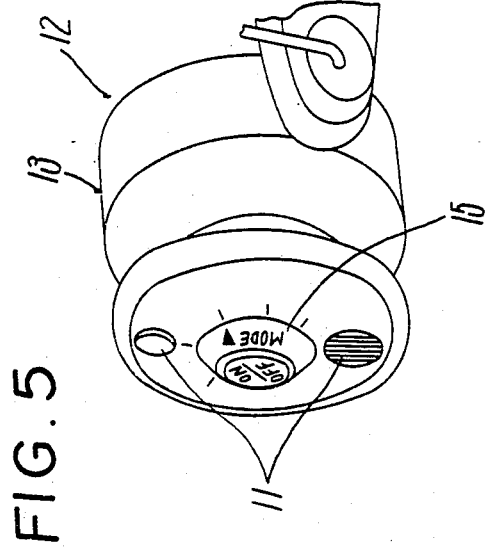
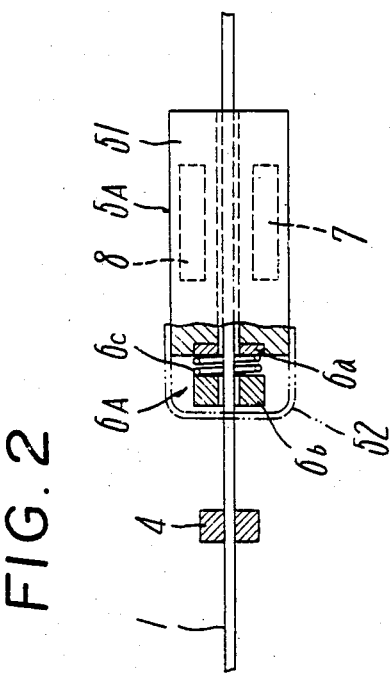
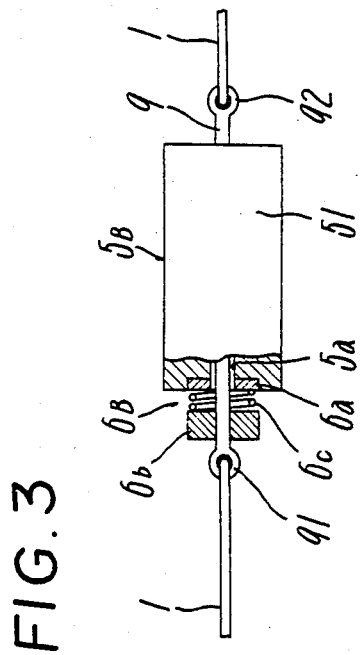

DETECTOR FOR DETECTING A BIT OF A FISH

FIELD OF THE INVENTION

The present invention relates to a detector for detecting a bite of a fish, which is mounted on a fishing line carrying a fish-hook, and more particularly, to a detector for detecting a bite of a fish, which is adapted to enable an angler on the shore to detect a fish which is biting on a worm or the like carrying the fish-hook.

BACKGROUND OF THE INVENTION

Conventionally, the angler, when using a worm with a fish-hook for fishing, detects a bite of the fish, such as a black bass, by vibrations transmitted through the fishing line.

He pulls the worm to his side while moving it in a dancing manner like a live bait on or below the surface of the water, thereby provoking the appetite of the fish to bite the worm. When the fish bites the worm, instantaneously the angler pulls the line to thereby hook the fish and pull it in.

The black bass, however, has the habit of disgorging the bait immediately when it is found to be a foreign object, such as an artificial worm. Hence, it is required to strike the fish the instant it bites the worm. However, it is difficult for beginning fishermen to do so with the requisite precise timing and such fishermen cannot in fact expect a good catch.

SUMMARY OF THE INVENTION

An object of the present invention is to provide a detector for detecting a bite of a fish, which electrically detects the fish when it bites the worm, thereby enabling an angler to pull the fish line without delay, and successfully hook the fish.

In other words, given that a fish, such as a black bass, bites the worm and pulls it in a direction reverse to the direction in which the line is pulled by the angler, the present invention is designed to provide a detector which electrically detects the pull of the fish and outputs a detection signal, so that the angler strikes the fish on the basis of the detection signal, thereby ensuring easy fishing even for the beginner.

The detector for detecting a bite of a fish according to the present invention is characterized by comprising a stopper fixed to the fishing line at a position spaced apart a predetermined distance from the fish-hook, an oscillator movably mounted on the line between the stopper and the fish-hook, and a receiver. The oscillator is provided with a sensor which operates when it is in contact with the stopper, an oscillation unit actuated by operation of the sensor to emit an output signal, and an electric power source. Hence, when the fish pulls the line, the stopper together with the line moves relative to the oscillator so as to come into contact with the sensor, thereby emitting an output signal from the oscillation unit so as to detect a fish bite on the worm.

Thus, the angler detects via the receiver the output signal emitted from the oscillation unit when the fish bites the bait to pull the line, and thereby immediately pulls the line toward himself, i.e., in the reverse direction to the pull of the fish, thus enabling a good catch.

These and other objects of the invention will be more fully apparent by reference to the description herein, taken in connection with the accompanying drawings.

BRIEF DESCRIPTION OF THE DRAWINGS

FIG. 1 is a partially cutaway side view of the first embodiment of a detector for detecting a bite of a fish, according to the invention, FIGS. 2 through 4 are partially cutaway side views of the principal portions of second through fourth embodiments of the detector for detecting a bite of a fish of the invention respectively, FIG. 5 is a partially omitted perspective view illustrating a receiver of the invention mounted on a fishing reel.

DETAILED DESCRIPTION OF THE INVENTION

Figure 6:
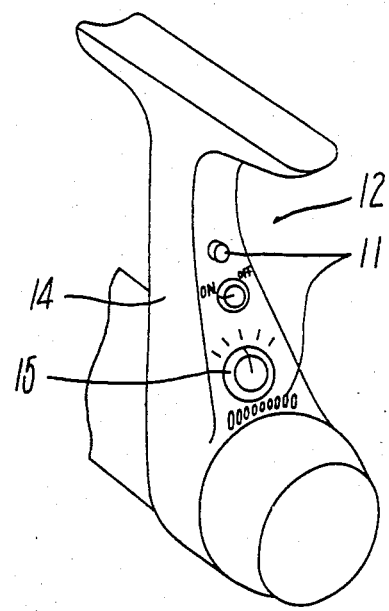
FIG. 6 is a partially cutaway side view illustrating another receiver of the inventon mounted on the fishing reel, and FIGS. 7 and 8 respectively are electric circuit digrams of oscillators of the invention.

Referring to FIG. 1, a first embodiment of a detector for detecting a bite of a fish of the invention is shown, which is applicable to a fishing line 1, one end of which connects a fish-hook 3 carrying a worm 2 formed mainly of a soft material.

A stopper 4 is mounted on the line 1 at a position apart from the fish-hook 3 by a predetermined distance and an oscillator 5 is mounted on the line 1 between the fish-hook 3 and the stopper 4 to be movable relative to each other. Oscillator 5 is actuated by the stopper 4 which moves close to or abuts against the oscillator 5.

The oscillator 5 comprises a sensor 6 and an oscillation unit 7, with the sensor 6 being disposed opposite to the stopper 4. Hence, the stopper 4 moves toward the oscillator 5 when a fish bites the worm to pull the line 1, and approaches or abuts against the sensor 6, so that the oscillation unit 7 is given an output signal from the sensor 6 to thereby emit radio waves or ultrasonic waves.

In detail, as shown in FIG. 1, the stopper 4 is fixed on the fishing line described above and a through bore 51a is formed at the center of a casing 51 constituting the oscillator 5 so that the oscillator 5 is fitted freely onto the line 1 between the stopper 4 and the hook 3 through the through bore 51a. Sensor 6 is positioned at the end surface of the casing 51 opposite to the stopper 4.

In the first embodiment, the stopper 4 employs a magnet and the sensor 6 employs a reed switch, so that the magnet moves close to or abuts against the reed switch to cause an output signal to be provided from the reed switch to the oscillation unit 7.

In addition, in the casing 51 is incorporated a battery 8, such as button cells.

Referring to FIG. 2, a second embodiment is shown, in which a sensor 6A at an oscillator 5A comprises a reed switch 6a and a magnet 6b which are opposite to each other at a predetermined interval, and a spring 6c is interposed between the reed switch 6a and the magnet 6b. When the stopper 4 fixed to the line 1 spaced apart from the magnet 6b at a predetermined distance abuts against the magnet 6b, the magnet 6b moves toward the reed switch 6a against the spring 6c, thereby causing an signal to be provided from the reed switch 6a to the oscillation unit 7.

Also, a cover 52 of a flexible material is provided at the sensor 6 and fixed to the casing 51.

Referring to FIG. 3, a third embodiment is shown, which employs a support rod 9 provided at both lengthwise ends with connectors 91 and 92. The support rod 9 is mounted on the line 1 at the hook side thereof and carries an oscillator 5B slidably. Connectors 91 and 92 function to regulate a range of slidable movement of the oscillator 5B.

The oscillator 5B in the third embodiment, the same as in the second embodiment, includes a sensor 6B comprising a reed switch 6a mounted on the casing 51 and a magnet 6b mounted through a spring 6c on the outer surface of the reed switch 6a at a side of the connector 91 serving as a stopper. In this embodiment the support rod 9 also moves following the pulled line 1 and allows the magnet 6b to move close to the reed switch 6a, so that the reed switch 6a operates to cause an output signal to be provided from an oscillation unit at the oscillator 5B.

Thus, the oscillator 5B provided with the support rod 9 having the connectors 91 and 92 as described above prevents the line 1 from being cut often near the worm 2.

Referring to FIG. 4, a fourth embodiment of the fish bite detector of the invention is shown, in which a sensor 6C comprises a switch contact 6d and a reed 6e provided part therefrom at a predetermined distance. Contact 6d and reed 6e are disposed in a guard 10 provided at one side of the casing 51 so that the stopper 4 opposite to the reed 6e abuts thereagainst to bring the reed 6e into contact with the contact 6d, whereby an oscillation unit at an oscillator 5C receives the output signal and emits radio ultrasonic waves.

A receiver 11, which receives the radio waves or the ultrasonic waves emitted from the oscillation unit and informs the angler of a bite of the fish through a buzzer or a lamp, is mounted on the utmost end of a spool 13 at a spinning reel 12 as shown in FIG. 5, on a mounting leg 14 of the reel 12 for the fishing rod as shown in FIG. 6, or on a reel body 12 (not shown). Also, for a double bearing reel, the buzzer or the lamp may be mounted on one of a pair of side frames, a stay between the side frames, or a thumb rest. Thus, the receiver 11 is not defined or limited in its mounting position. Alternatively, the receiver 11 may be contained in the angler's pocket, or attached to a buoy so that it floats on the surface of the water. In the latter case, the receiver 11 ensures that the angler detects the information signal, such as sound or light, without being affected by the attenuation or the refraction of the radio wave or the ultrasonic wave, and also has the advantage of being not restricted in size. Where a buoy is used, a receiver without a buzzer or lamp may be provided on the buoy and the buzzer or lamp may be provided at the reel. Hence, even when a number of anglers are fishing, it is advantageous to recognize with ease the particular receiver which has provided the information signal.

In order to improve the receiving capacity of the receiver 11 for the radio waves or ultrasonic waves emitted from the oscillator 5, an antenna may be incorporated in the fishing rod, or a long cord may be used as an antenna with one end placed in the water.

The embodiments of the receivers 11 in FIGS. 5 and 6 are provided with dials 15 for selecting the frequency of the radio wave or the ultrasonic wave from the oscillators 5, respectively.

When a number of anglers each use the aforesaid detector for a detecting bite of a fish during fishing, the risk exists that the radio waves or the ultrasonic waves emitted from one oscillator 5 will interfere with the other units to result in a malfunction. To avoid this problem, oscillator 5 has been constructed as shown in FIGS. 7 and 8.

Figure 7:
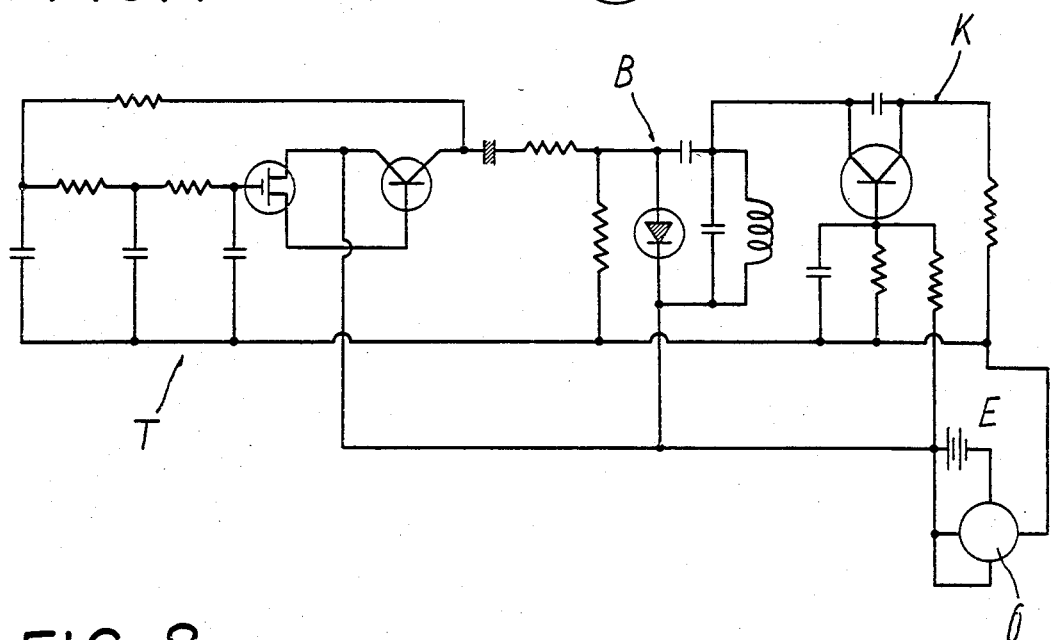

FIG. 7 shows an electric circuit diagram of the oscillator 5, in which a circuit connecting a power source E and the sensor 6 is connected with a low frequency oscillation circuit T, a high frequency oscillation circuit K and a varicap circuit B, thereby forming a modulation circuit. The varicap circuit B has its capacitance varied to modulate the electric waves output from the high frequency circuit K, and the receiver 11 can identify the particular oscillator 5 emitting the signal by the low frequency carried on the electric waves, thereby preventing interference between the respective oscillators.

Figure 8:
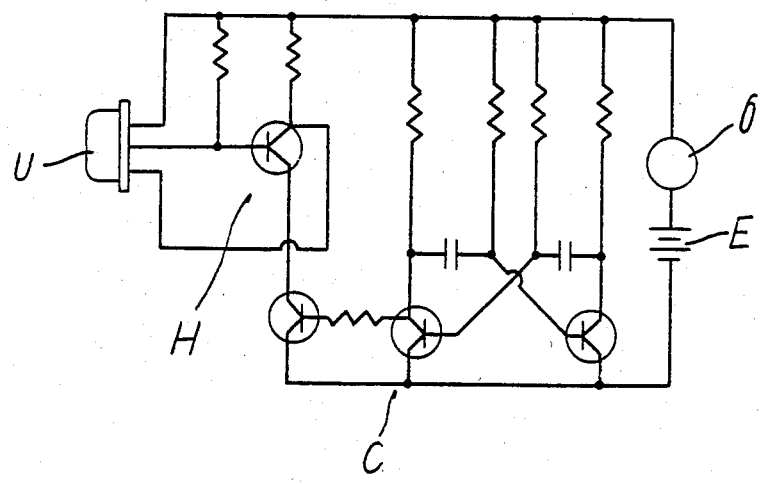

Next, FIG. 8 shows an electric circuit diagram of an oscillator 5 which emits ultrasonic waves. In the electric circuit, a connection circuit connecting power source E and sensor 6 is connected with an ultrasonic wave oscillation circuit H, an adjusting circuit C for variably adjusting ultrasonic waves output from the oscillation circuit H, and an ultrasonic oscillation unit U. The adjusting circuit C is adjusted to result in intermittent ultrasonic waves being output from the oscillation unit U, whereby the receiver 11 identifies the corresponding receiver 11 through the intermittence time.

The detector for a bite of a fish of the invention constructed as described above allows the stopper 4 to approach the sensor 6 or abut thereagainst through the line pulled by a fish biting the worm; a signal is output from the sensor 6 to the oscillation unit. As a result, radio or ultrasonic waves are emitted therefrom and received by the receiver 11 to thereby inform the angler that a fish has bitten the worm. Then, the angler strikes the fish according to the information from the receiver 11, thereby fishing the hooked fish via the hook 3 in worm 1.

Although several embodiments have been described, they are merely exemplary of the invention and are not to be construed as limiting, the invention being defined solely by the appended claims.

What is claimed is:

1. A detector for detecting a bite of a fish, said detector being mounted on a fishing line carrying a fish hook, said detector comprising:

a stopper fixed to said fishing line at a position spaced a predetermined distance from said fish hook, an oscillator movably mounted on said fishing line between said stopper and said fish hook, said oscillator including a sensor actuated by said stopper when said stopper is moved in close proximity to said sensor and an oscillation unit emitting an output signal responsive to actuation of said sensor, and a receiver receiving said output signal from said oscillation unit, whereby when a fish pulls said fish hook, said stopper together with said fishing line is moved relative to said oscillator and said oscillation unit emits said output signal responsive to actuation of said sensor by said stopper moving in close proximity to said sensor, thereby detecting the bite of the fish.

2. A detector for detecting a bite of a fish as set forth in claim 1, wherein said sensor comprises a reed switch and said stopper positioned opposite to said sensor comprises a magnet.

3. A detector for detecting a bite of a fish as set forth in claim 1, wherein said sensor comprises (i) a magnet positioned opposite to said stopper and (ii) a reed switch, and a spring is interposed between said reed switch and said magnet for maintaining said reed switch in a non-operating condition.

4. A detector for detecting a bite of a fish as set forth in claim 1, wherein said sensor comprises a switch contact and a reed, said reed being disposed opposite to said stopper.

5. A detector for detecting a bite of a fish as set forth in claim 1, further comprising a support rod having at both its lengthwise ends connecting portions for connection to said fishing line, said oscillator being supported slidably relative to said support rod, said connecting portions each serving as a stopper for regulating a range of sliding motion of said oscillator.

* * * * *